(12) United States Patent
Jeong et al.

(10) Patent No.: US 8,516,589 B2
(45) Date of Patent: Aug. 20, 2013

(54) APPARATUS AND METHOD FOR PREVENTING VIRUS CODE EXECUTION

(75) Inventors: Bok-deuk Jeong, Yongin-si (KR); Sung-min Lee, Suwon-si (KR); Sang-bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 635 days.

(21) Appl. No.: 12/751,886

(22) Filed: Mar. 31, 2010

(65) Prior Publication Data

US 2010/0257608 A1    Oct. 7, 2010

(30) Foreign Application Priority Data

Apr. 7, 2009   (KR) .................. 10-2009-0029986

(51) Int. Cl.
*G06F 21/00* (2006.01)

(52) U.S. Cl.
USPC ................... 726/24; 726/22; 726/23

(58) Field of Classification Search
USPC ..................................... 726/22–24
See application file for complete search history.

(56) References Cited

U.S. PATENT DOCUMENTS

| | | |
|---|---|---|
| 7,155,741 B2 | 12/2006 | Sobel et al. |
| 7,228,563 B2 | 6/2007 | Szor |
| 7,287,281 B1 | 10/2007 | Szor |
| 7,340,777 B1 | 3/2008 | Szor |
| 7,373,667 B1 | 5/2008 | Millard |
| 7,392,541 B2 | 6/2008 | Largman et al. |
| 7,984,304 B1 * | 7/2011 | Waldspurger et al. ........ 713/187 |
| 2003/0101381 A1 * | 5/2003 | Mateev et al. .................. 714/38 |
| 2006/0233367 A1 | 10/2006 | Birrell et al. |
| 2007/0226795 A1 * | 9/2007 | Conti et al. ..................... 726/22 |
| 2008/0040710 A1 * | 2/2008 | Chiriac ......................... 717/136 |
| 2008/0148399 A1 | 6/2008 | Winkler |
| 2008/0222729 A1 | 9/2008 | Chen et al. |
| 2008/0235534 A1 | 9/2008 | Schunter et al. |
| 2008/0235793 A1 | 9/2008 | Schunter et al. |
| 2008/0250499 A1 | 10/2008 | Moat et al. |
| 2010/0023810 A1 * | 1/2010 | Stolfo et al. .................... 714/38 |

FOREIGN PATENT DOCUMENTS

| | | |
|---|---|---|
| KR | 10-2004-0085266 | 10/2004 |
| KR | 10-2005-0052529 | 6/2005 |
| WO | WO 97/27539 | 7/1997 |

OTHER PUBLICATIONS

Ruwase, Olatunji, and Monica S. Lam. "A practical dynamic buffer overflow detector." In Proceedings of the 11th annual network and distributed system security symposium. 2004.*

Crispin Cowan, et al., "StackGuard: Automatic Adaptive Detection and Prevention of Buffer-Overflow Attacks," *In Proc. of the 7th USENIX Security Symposium*, Jan. 26-29, 1998, pp. 63-78, San Antonio, Texas, USA.

David Wagner, "A First Step Towards Automated Detection of Buffer Overrun Vulnerabilities," *In Proc. of the Network and Distributed System Security Symposium* (*NDSS*), Feb. 2-4, 2000, pp. 1-15, San Diego, CA, USA.

* cited by examiner

*Primary Examiner* — Brandon Hoffman
*Assistant Examiner* — Thomas C Lauzon
(74) *Attorney, Agent, or Firm* — NSIP Law

(57) ABSTRACT

An apparatus and method for preventing virus code execution through buffer overflow management are provided. When buffer overflow occurs during execution of a kernel module or application program, the apparatus and method may perform virus inspection on a program execution region moved by the buffer overflow.

10 Claims, 5 Drawing Sheets

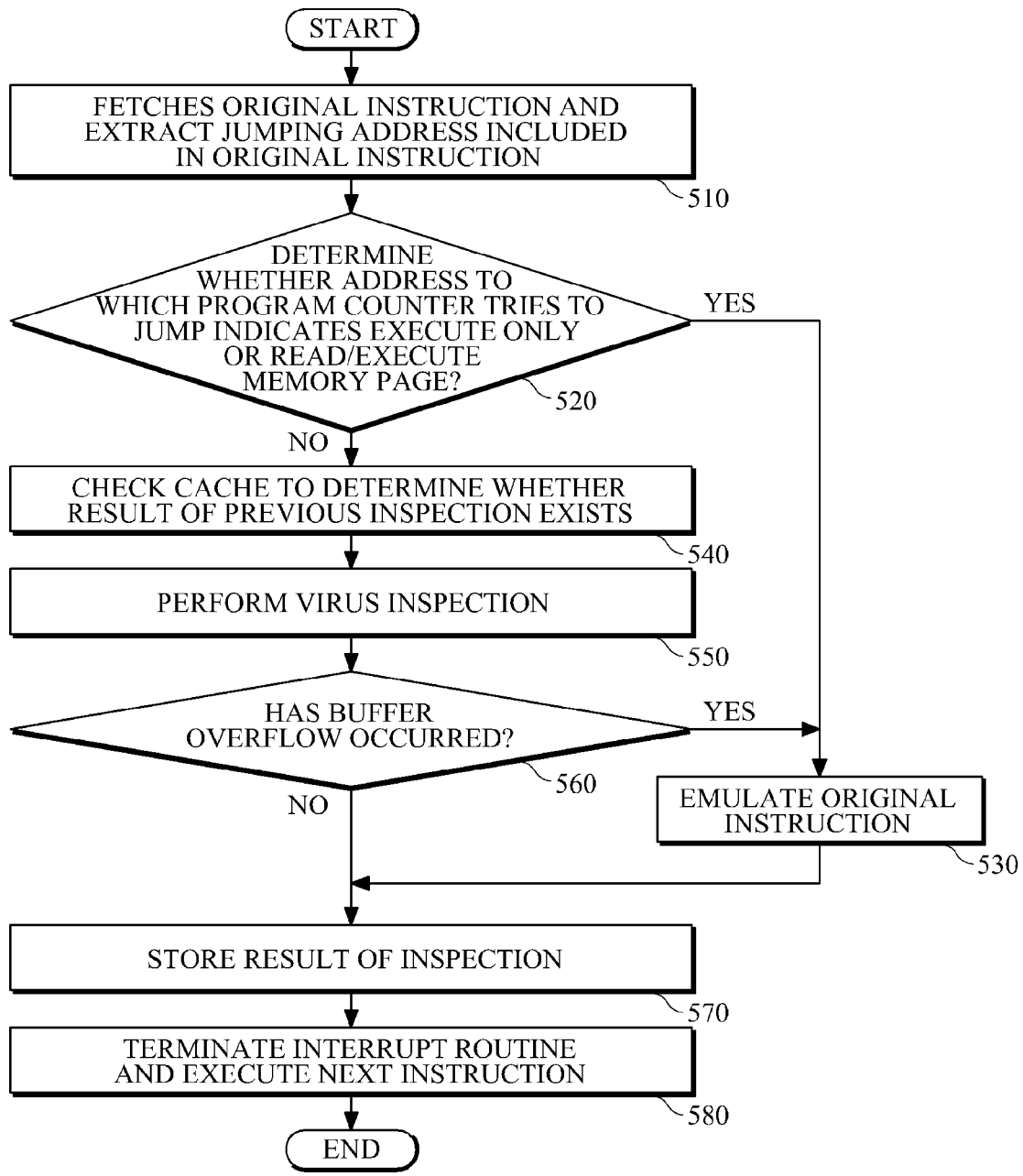

APPARATUS AND METHOD FOR PREVENTING VIRUS CODE EXECUTION

CROSS-REFERENCE TO RELATED APPLICATION(S)

This application claims the benefit under 35 U.S.C. §119(a) of Korean Patent Application No. 10-2009-0029986, filed on Apr. 7, 2009, in the Korean Intellectual Property Office, the entire disclosure of which is incorporated herein by reference for all purposes.

BACKGROUND

1. Field

The following description relates to program security, and more particularly, to an apparatus and method for preventing virus code execution through buffer overflow management.

2. Description of the Related Art

A buffer overflow condition exists when a program attempts to put more data in a buffer is than it can hold or when a program attempts to put data in a memory area past a buffer. As described herein, a buffer is a sequential section of memory allocated to contain data, for example, a character string, an array of integers, and the like. Writing outside the bounds of a block of allocated memory such as a buffer can corrupt data, crash the program, or cause the execution of malicious code.

Buffer overflow is one of the most known forms of software security vulnerability. Most software developers know what buffer overflow vulnerability is, but buffer overflow attacks against both older and newly-developed applications are still quite common. Part of the problem is due to the wide variety of ways buffer overflows can occur, and part is due to the error-prone techniques often used to prevent them.

When buffer overflow occurs, unexpected operation may occur. Unexpected operations may occur when system attackers, such as hackers or crackers, redirect execution of program to an arbitrary region by overwriting return addresses stored in buffers or overwriting function pointers declared as global or local variables, using such buffer overflow. If they insert virus codes into the arbitrary region, the virus codes will be executed.

To prevent such unexpected operations, a method for checking a maximum available size of a data array upon has been proposed. However, the checking process may be omitted on purpose or by accident.

SUMMARY

In one general aspect, provided is an apparatus for preventing virus code execution, the apparatus including a code converter to convert code of a kernel module or an application program into an interrupt instruction, when execution of the kernel module or the application program is detected, a code check unit to determine, when exception is generated by execution of the interrupt instruction, whether buffer overflow occurs, and a virus detection engine to perform virus inspection on a program execution region moved by the buffer overflow.

The virus detection engine may be installed in at least one virtual machine in which the kernel module or the application program is executed.

The apparatus may further include a plurality of virus detection engines and a virus detection engine connector to connect the plurality of virus detection engines and transfer the codes of the kernel module or the application program to the plurality of virus detection engines.

The apparatus may further include a code reservoir to store the codes of the kernel module or the application program and converted codes of the kernel module or the application program.

The apparatus may further include a code emulator to execute, if a virus is not detected by the virus detection engine, the codes of the kernel module or the application program.

In another aspect, provided is a method for preventing virus code execution, the method including detecting execution of a kernel module or an application program, converting a code of the kernel module or the application program into an interrupt instruction, in response to an execution of the interrupt instruction generating an exception, determining whether buffer overflow occurs, and in response to determining that buffer overflow occurs, performing virus inspection on a program execution region moved by the buffer overflow.

The converting code may include scanning an instruction included in the code of the kernel module or the application program, determining whether the instruction is an instruction for modifying a program counter, or for a branching or jumping instruction for modifying a flow of program execution, in response to determining that the instruction is for modifying the program counter, or for a branching or jumping instruction for modifying the flow of program execution, the converting further includes determining whether a region where the kernel module or the application program is executed is a memory region which has not been set to execute only or read/execute, and in response to determining that the memory region has not been set to execute only or read/execute, the converting further includes converting the code of the kernel module or the application program into the interrupt instruction.

The determination on whether buffer overflow occurs may include fetching an original instruction stored at an address where an interrupt occurs and analyzing an address value which the program counter tries to acquire, determining whether a memory region including an address which the program counter tries to acquire is a memory region which has been set to execute only or read/execute, in response to determining that the memory region has not been set to execute only or read/execute, the determination further includes determining whether buffer overflow occurs in a corresponding page, checking a cache to determine whether a corresponding code has previously been executed and whether virus inspection has previously been performed on the corresponding code, and in response to no history related to previous virus inspection being found in the cache, the determination further includes requesting virus inspection on the memory region including the address which the program counter tries to acquire.

If it is determined that no buffer overflow occurs, the method may further include calling a code emulator to execute an original instruction before being replaced with the interrupt instruction.

The method may further include storing, in a cache, a result of virus inspection performed on a region to which the program counter moves, terminating an interrupt routine, and executing a next instruction following the interrupt.

Other features and aspects will be apparent from the following detailed description, the drawings, and the claims.

BRIEF DESCRIPTION OF THE DRAWINGS

FIG. 5 is a flowchart illustrating an example of a buffer overflow detection method.

Figure 1:
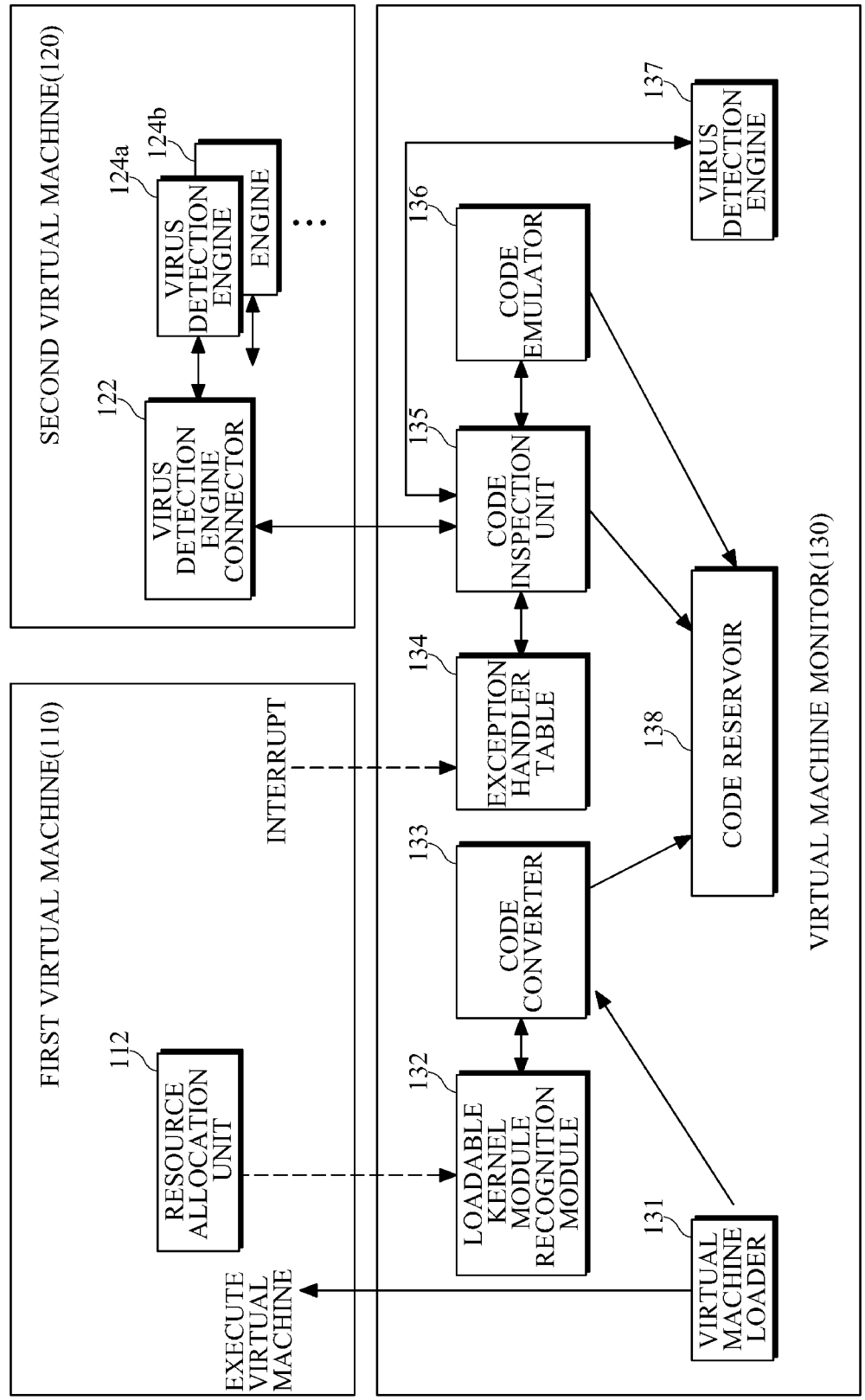
FIG. 1 is a diagram illustrating an example system for detecting buffer overflow in a virtual machine kernel.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

A buffer, also called buffer memory, is a portion of a computer's memory that is set aside as a temporary holding place for data that is being sent to and/or received from an external device, for example, a hard disk drive (HDD), a keyboard, a printer, and the like.

FIG. 1 illustrates an example of a system for detecting buffer overflow in a virtual machine kernel.

As shown in the example of FIG. 1, the system includes a first virtual machine 110, a second virtual machine 120, and a third virtual machine 130. However, any desired amount of virtual machines (VMs) may be used in the system. For example, one VM, two VMs, three VMs, or more. Virtual machine monitor 130 is an apparatus for preventing virus code execution by detecting buffer overflow. In this example, the virtual machine monitor 130 includes a virtual machine (VM) loader 131, a loadable kernel recognition module 132, a code converter 133, an exception handler table 134, a code inspection unit 135, a code emulator 136, a virus detection engine 137, and a code reservoir 138. The virtual machine monitor 130 detects the occurrence of buffer overflow and may perform one or more operations in response to the buffer overflow. For example, the virtual machine monitor 130 may perform a virus inspection on a virtual machine kernel.

A first virtual machine 110 may be an Operating System (OS) or an application, for example, an application that monitors whether a buffer overflow has occurred, and the like. The application may monitor one or more virtual machines, for example, two VMs, three VMs, or other desired amount. The first virtual machine 110 includes a resource allocation unit 112 to allocate resources to the OS or the application.

A second virtual machine 120 may be an application, for example, an application for performing virus inspection when buffer overflow has been detected. The second virtual machine 120 may include, for example, a virus detection engine connector 122 and virus detection engines 124a and 124b. The virus detection engine connector 122 and the virus detection engines 124a and 124b may perform the virus inspection. In this example, two virus detection engines 124a and 124b are used. However, any desired amount of virus detection engines may be used, for example, one detection engine, two detection engines, three detection engines, or more. The second virtual machine 120 may be configured to prevent network access and/or prevent file sharing to prevent attackers from accessing the system and to enhance the security of the system.

The virtual machine monitor 130 in the example of FIG. 1 includes, as described above, the VM loader 131, the loadable kernel recognition module 132, the code converter 133, the exception handler table 134, the code inspection unit 135, the code emulator 136, the virus detection engine 137, and the code reservoir 138.

The loadable kernel recognition module 132 detects a kernel module inserted into the first virtual machine 110 and/or a kernel module executed in the first virtual machine 110. The code converter 133 may convert binary codes of the OS. The code reservoir 138 stores information regarding the converted codes. The code inspection unit 135 determines whether buffer overflow occurs, when an exception is generated by the exception handler table 134. The exception handler table 134 may generate an exception based upon the converted codes of the OS. The virus detection engine connector 122 transfers codes to be inspected, to the virus detection engines 124a and 124b. Virus detection engines 124a and 124b determine whether the codes have been infected by a virus or other malicious attack. The code emulator 136 emulates the original codes of the virtual machine and executes it.

The VM loader 131 calls the code converter 133 to transfer OS binary codes or OS binary code addresses to the code converter 133. VM loader 131 may perform, for example, memory space allocation, initialization of a data structure for virtual machine management, and the like, to execute the virtual machine. The code converter 133 converts a part of the OS binary codes into an interrupt instruction and then returns the converted OS binary codes to the VM loader 131.

The loadable kernel recognition module 132 detects a kernel module inserted into the virtual machine during operation of the virtual machine, and may convert a binary code of the loadable kernel module into an interrupt instruction. Insertion of a loadable kernel module may be detected when the loadable kernel recognition module 132 monitors a system call made by a user level application virtual machine. The user level application virtual machine may be used for the insertion of the loadable kernel and may inspect the system call and parameters used for the system call.

The code reservoir 138 is a database which may store addresses of codes converted by the code converter 133. The code reservoir 138 may also store original code information. The code inspection unit 135 inspects the attributes of a memory page that may include a new address which a program counter tries to acquire. When an error is found, the code inspection unit 135 may request further inspection by the virus detection engine connector 122 of the second virtual machine 120.

The code inspection unit 135 is a handler which processes an interrupt inserted into an OS binary code or application binary code by the code converter 133. The code inspection unit 135 may be, for example, registered directly in the exception handler table 134 or called by an interrupt handler. The code inspection unit 135 transfers a program code from the address of a converted code, to the virus detection engine connector 122.

The virus detection engine connector 122 transfers the program code transferred by the code inspection unit 135 of the virtual machine monitor 130 to the virus detection engines 124*a* and 124*b*. The virus detection engine connector 122 requests that the virus detection engines 124*a* and 124*b* inspect the program code. One or more virus detection engines may be provided, for example, two virus detection engines 124*a* and 124*b*. In some embodiments, the virtual machine monitor 130 may include a virus detection engine 137. In the example of FIG. 1, the virus detection engine connector 122 does not operate in the first virtual machine 110 on which inspection is to be performed, but operates in the second virtual machine 120.

The system described in FIG. 1 is merely for purposes of example. Any desired number of virtual machines may be used in the system, for example, one VM, two VMs, three VMs, or more. One or more virtual machines may be used for virus detection. One or more virtual machines may be as an OS or an application. In some embodiments, a virtual machine may include virus detection and monitoring capabilities, instead of using separate virtual machines for each.

The virus detection engine connector 122 receives the result of the inspection performed by the virus detection engines 124*a* and 124*b* and transfers the result of the inspection to the code inspection unit 135.

The code emulator 136 emulates the application code converted by the code converter 133 and executes the emulated application code, instead of its original code, in the virtual machine monitor 130.

Figure 2:
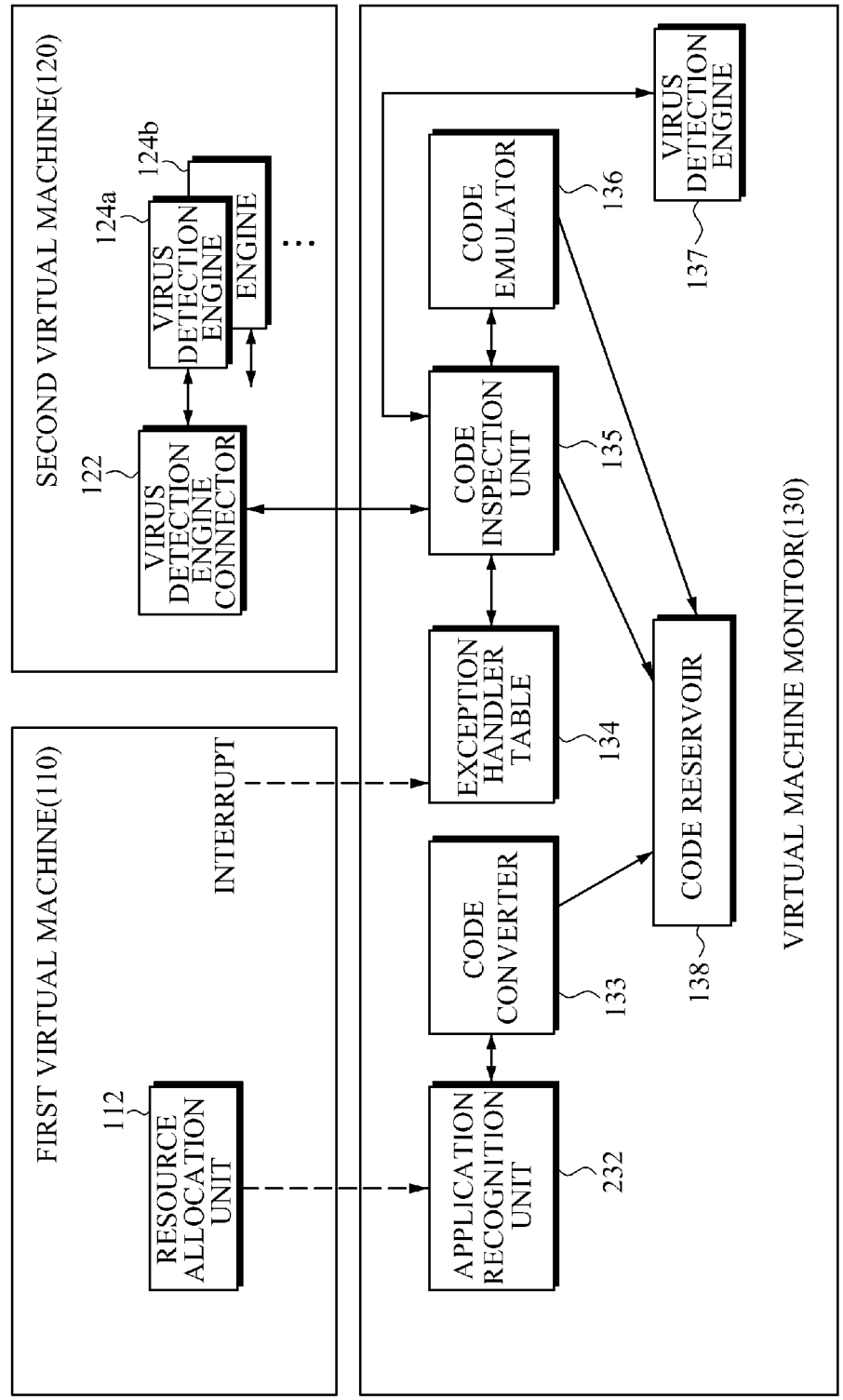
FIG. 2 is a diagram illustrating an example system for detecting buffer overflow in a user application.

FIG. 2 illustrates an example of a system for detecting buffer overflow in a user application.

As shown in FIG. 2, the system for detecting buffer overflows may be used to prevent virus code execution that occurs at a user application level. The system of FIG. 2 may include an application recognition unit 232 instead of the loadable kernel recognition module 132 of FIG. 1. The system may detect preparation behaviors of the OS for application execution when a user application starts, thus maintaining information of the user application.

The application recognition unit 232 may causes the code converter 133 to convert the binary code. The converted binary code may be used to detect buffer overflow.

In some embodiments, the application recognition unit 232 may exist at the kernel level of a virtual machine.

Figure 3:
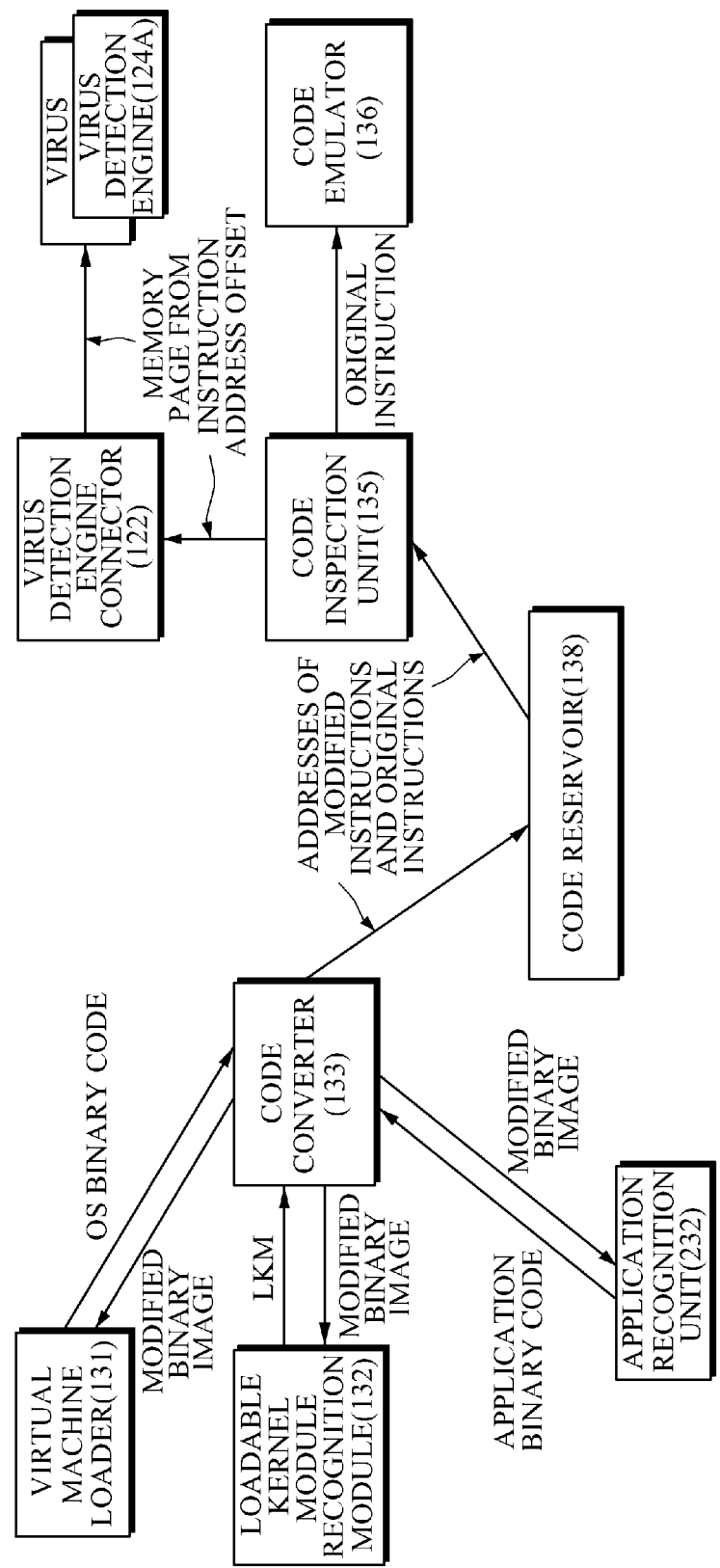
FIG. 3 is a diagram illustrating an example of data flow between modules.

FIG. 3 illustrates an example of data flow between modules in a system for detecting buffer overflows.

Referring to FIGS. 1 and 3, the VM loader 131 transfers OS binary codes or addresses of OS binary codes to the code converter 133. The code converter 133 converts a part of the codes into an interrupt instruction and then returns the converted OS binary codes to the VM loader 131. The loadable kernel recognition module 132 may detect a kernel module dynamically inserted into a virtual machine while the virtual machine operates, and may transfer loadable kernel binary codes to the code converter 133. The code converter 133 converts a part of the loadable kernel binary codes into an interrupt instruction.

Referring to FIGS. 2 and 3, if the system includes an application recognition unit 232, the application recognition unit 232 may transfer application binary codes to the code converter 133. The code converter 133 converts a part of the application binary codes into an interrupt instruction to detect buffer overflow. The converted instruction and original instructions may be stored in the code reservoir 138.

The code inspection unit 135 is a handler which may process an interrupt inserted into the converted OS binary codes or application binary codes stored in the code reservoir 138. The code inspection unit 135 may transfer a program code from the address of a converted code to the virus detection engine connector 122, so that the virus detection engines 124*a* and 124*b* may perform virus inspection. Meanwhile, the code emulator 136 may emulate the converted user application code.

Figure 4:
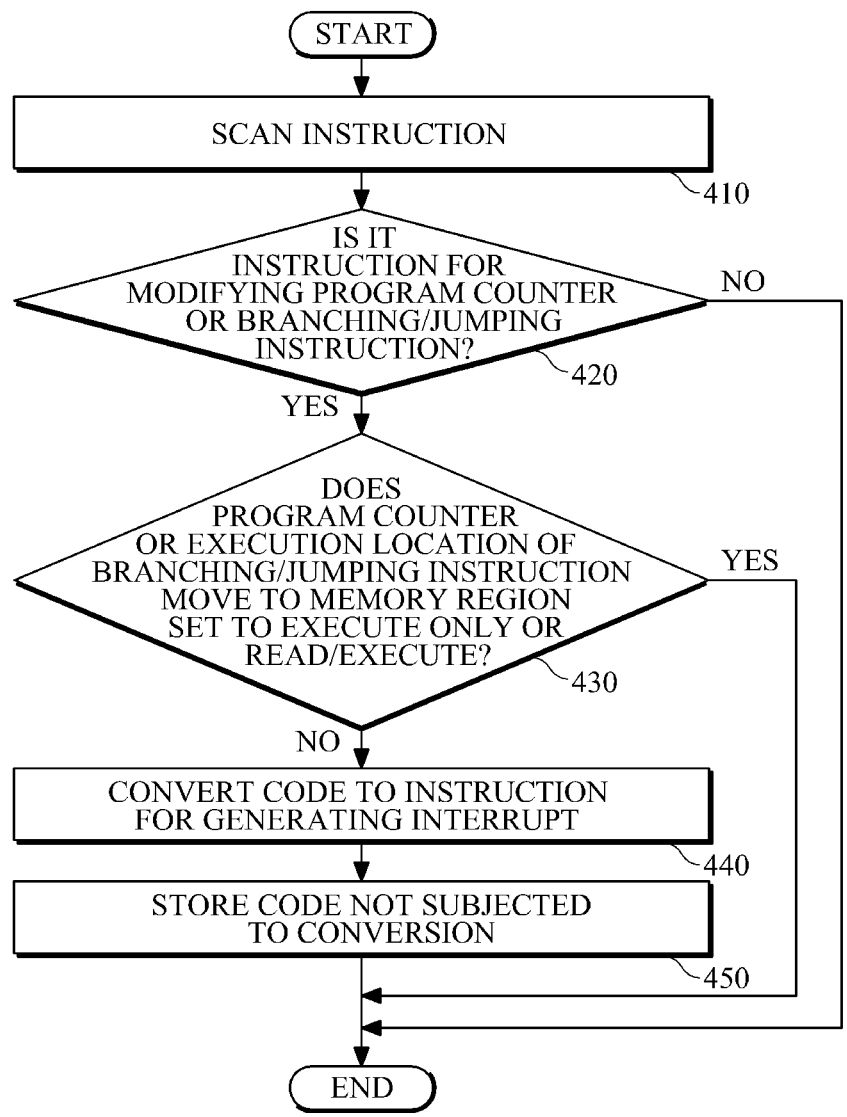
FIG. 4 is a flowchart illustrating an example of a binary code conversion method for buffer overflow monitoring.

FIG. 4 illustrates a flowchart of an example of a binary code conversion method for buffer overflow monitoring.

As shown in FIGS. 1, 2 and 4, the code converter 133 converts OS binary codes or application binary codes to detect buffer overflow. When the code converter 133 is called by the VM loader 131 or the application recognition unit 232, code conversion is started.

In 410, the code converter 133 scans instructions included in an OS binary code and/or a kernel module that may be included in an application binary codes and/or library codes used by applications. While scanning the instructions, the code converter 133 searches, in 420, for any instructions capable of modifying a program counter and/or for any branching or jumping instructions capable of modifying a flow of program execution. If the code converter 133 finds an instruction capable of modifying a program counter, or capable of a branching or jumping instruction, in 430, the code converter 133 analyzes an operand of the instruction. The code converter 133 may determine that the program counter or the execution location of the branching or jumping instruction moves to a memory region which has not been set to execute only or read/execute.

If the execution location of the branching or jumping instruction moves to a memory region that has not been set to execute only or read/execute, the code converter 133 converts the corresponding code into an instruction for generating an interrupt to transfer control to a virtual machine monitor in 440. For example, if an instruction which is being scanned is an instruction for performing a certain operation on a program counter value, the code converter 133 converts the corresponding code into an instruction for generating an interrupt. Meanwhile, codes not subjected to conversion are stored in the code reservoir 138, in 450.

The generated interrupt instruction is an instruction which allows a code being processed at an application or OS level, such as a software interrupt, to enter a virtual machine monitor level. When a software interrupt occurs, the software interrupt numbers that have not been used by a virtual machine monitor or OS may be used as parameter values.

In order to return, after a subroutine is executed by an interrupt, from the subroutine to a routine that has called the subroutine, an instruction for replacing a program counter with a return address stored in a stack may be used.

In the example shown in FIG. 4, because all instructions that can modify a program counter may be modified into instructions that may be called by the code inspection unit 135, inspection on the stack or buffer overflow may be performed when the routine returns from the subroutine. For example, when a function pointer declared as a global variable or local variable is modified due to buffer overflow, an instruction for modifying a program counter may be executed to execute the modified function. In this example, because a code has been modified to an interrupt instruction for inspecting codes, inspection on buffer overflow may be performed.

FIG. 5 illustrates a flowchart of an example of a buffer overflow detection method.

As shown in FIGS. 1 and 5, if an interrupt is generated by a code inserted to detect buffer overflow, the code inspection unit 135 may be called by an interrupt handler routine to detect occurrence of buffer overflow.

If an interrupt is generated by the interrupt handler routine, in 510 the code inspection unit 135 may fetch an original instruction stored at an address where the interrupt has been generated, from the code reservoir 138. The code inspection unit 135 may analyze an address which a program counter attempts to newly acquire.

In 520, a determination is made as to whether a memory page, including the address which the program counter attempts to acquire, is an execute only or a read/execute page. If a memory page including the address which the program counter attempts to acquire is an execute only or read/execute page, the code inspection unit 135 determines that no buffer overflow has occurred because the content of the corresponding address has never been overwritten, and accordingly emulation is performed in 530 to execute the original instruction that has been replaced with the interrupt instruction.

If a memory page includes the content of the corresponding address is a writable page, then an instruction at a jumping address may have been overwritten.

In 540, to determine whether the corresponding code has ever been executed and inspected by the code inspection unit 135, a cache of the code inspection unit 135 is checked. When checking the cache, a jumping address which the program counter tries to acquire and the content stored in the jumping address are used as inputs, and the output is the result of previous inspection on buffer overflow.

If the result of previous inspection is not found in the cache, in 550, program codes corresponding to memory pages starting from the jumping address are transferred to the virus detection engine 137 of the virtual machine monitor 130 to request the virus detection engine 137 to perform virus inspection. The memory pages may include the memory page starting with the jumping address as well as adjacent memory pages. Any desired amount of pages can be checked, for example, 2 pages, 4 pages, 6 pages, or more.

In some embodiments, the program codes may be transferred to the virus detection engine connector 122 of the second virtual machine 120 to request the virus detection engine connector 122 to inspect whether any virus code exists in the corresponding pages. The size of a program code to be subjected to virus inspection may be set by a user, or it may be set automatically. The virus detection engine connector 122 requests each of the virus detection engines 124a and 124b to inspect whether any virus exists in the program code, collects the results of the inspection, and transfers the collected results to the code inspection unit 135.

In 560, the code inspection unit 135 determines whether buffer overflow has occurred based on the collected results. If no buffer overflow is found, the code inspection unit 135 calls the code emulator 136 to execute the original instruction that has been replaced with an interrupt instruction, in 530. In 570, the result of the inspection on the jumping address is stored in the cache. In 580 the interrupt routine is terminated and a next instruction following the interrupt is executed.

Meanwhile, if buffer overflow is found, the code emulator 136 is not called for the corresponding code and thus a next instruction following an interrupt is executed without executing the original instruction (interrupt routine), so that no instruction of a region including virus codes may be executed.

According to the examples described herein, it is possible to achieve high detection rates of overflow attack on global variables, buffers, or stacks, without having to modify or recompile the OS or the application codes. Furthermore, it is possible to detect buffer overflow using only software without hardware support.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for preventing virus code execution, the apparatus comprising:
   a code converter configured to convert code of a kernel module or an application program into an interrupt instruction, in response to execution of the kernel module or the application program being detected;
   a code check unit configured to determine, in response to an exception being generated by execution of the interrupt instruction, whether buffer overflow occurs; and
   a virus detection engine configured to perform virus inspection on a program execution region moved by the buffer overflow.

2. The apparatus of claim 1, wherein the virus detection engine is configured to be installed in at least one virtual machine in which the kernel module or the application program is executed.

3. The apparatus of claim 2, further comprising a plurality of virus detection engines and a virus detection engine connector configured to connect the plurality of virus detection engines and transfer the code of the kernel module or the application program to the plurality of virus detection engines.

4. The apparatus of claim 1, further comprising a code reservoir configured to store the code of the kernel module or the application program and converted code of the kernel module or the application program.

5. The apparatus of claim 1, further comprising a code emulator configured to execute, if a virus is not detected by the virus detection engine, the code of the kernel module or the application program.

6. A method for preventing virus code execution, the method comprising:
   detecting execution of a kernel module or an application program;
   converting code of the kernel module or the application program into an interrupt instruction, if the execution of the kernel module or application program is detected;

in response to execution of the interrupt instruction generating an exception, determining whether buffer overflow occurs; and in response to determining that buffer overflow occurs, performing virus inspection on a program execution region moved by the buffer overflow.

7. The method of claim 6, wherein the converting code comprises:

scanning an instruction included in the code of the kernel module or the application program;

determining whether the instruction is an instruction for modifying a program counter, or for a branching or jumping instruction for modifying a flow of program execution;

in response to determining that the instruction is for modifying the program counter, or for a branching or jumping instruction for modifying the flow of program execution, the converting further comprises determining whether a region where the kernel module or the application program is executed is a memory region which has not been set to execute-only or read/execute; and in response to determining that the memory region has not been set to execute-only or read/execute, the converting further comprises converting the code of the kernel module or the application program into the interrupt instruction.

8. The method of claim 6, wherein the determination on whether buffer overflow occurs comprises:

fetching an original instruction stored at an address where an interrupt occurs and analyzing an address value which the program counter tries to acquire;

determining whether a memory region comprising the address value which the program counter tries to acquire is a memory region which has been set to execute-only or read/execute;

in response to determining that the memory region has not been set to execute-only or read/execute, the determination further comprises determining whether buffer overflow occurs in a corresponding page;

checking a cache to determine whether corresponding code has previously been executed and whether virus inspection has previously been performed on the corresponding code; and in response to no history related to previous virus inspection being found in the cache, the determination further comprises requesting virus inspection on the memory region comprising the address value which the program counter tries to acquire.

9. The method of claim 8, further comprising storing, in a cache, a result of virus inspection performed on a region to which the program counter moves, terminating an interrupt routine, and executing a next instruction following the interrupt.

10. The method of claim 6, wherein, if it is determined that no buffer overflow occurs, the method further comprises calling a code emulator to execute an original instruction before converting the code of the kernel module or the application program into the interrupt instruction.

\* \* \* \* \*